H. H. YOUNG.
SIDE CAR FOR MOTOR CYCLES.
APPLICATION FILED JULY 21, 1913.
1,235,177.
Patented July 31, 1917.
2 SHEETS—SHEET 2.
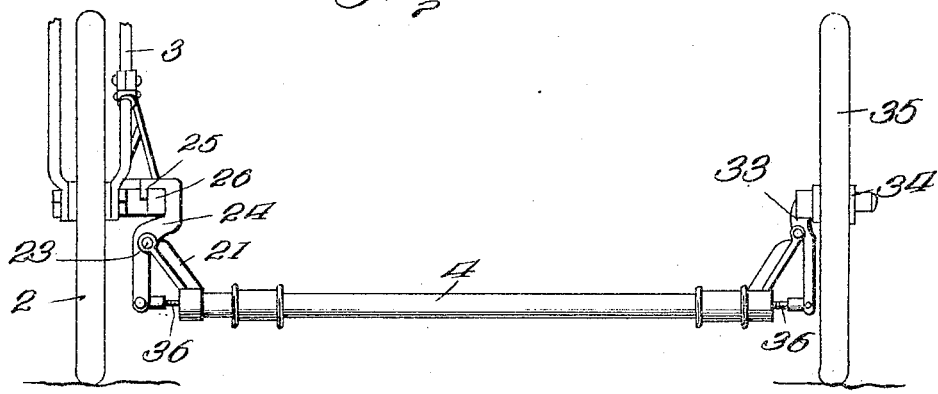
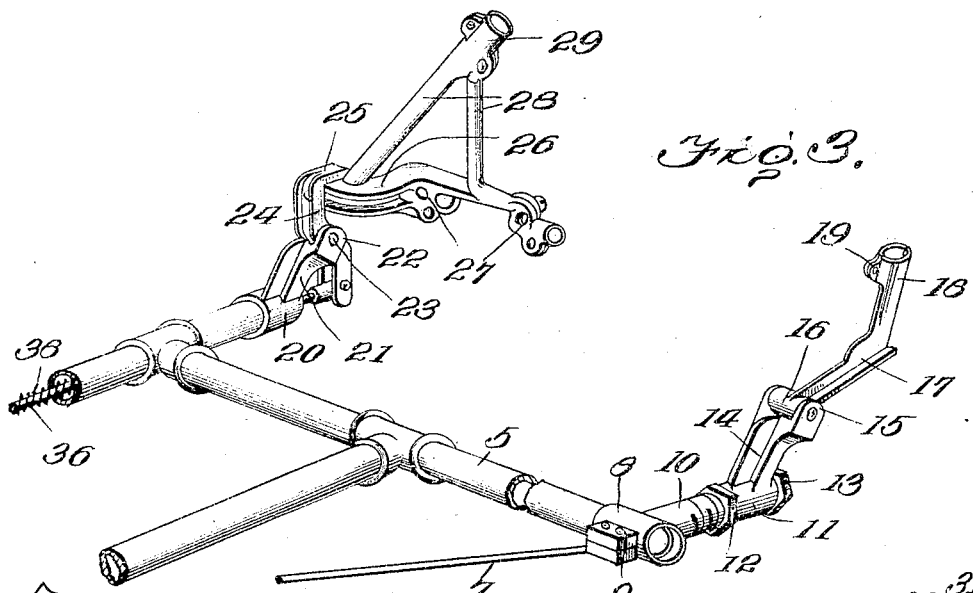
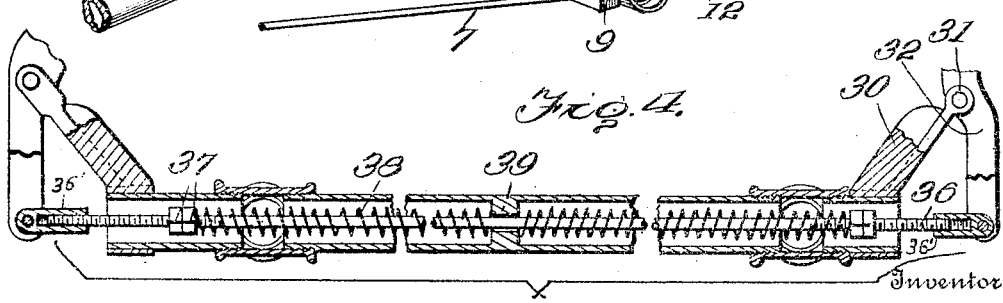

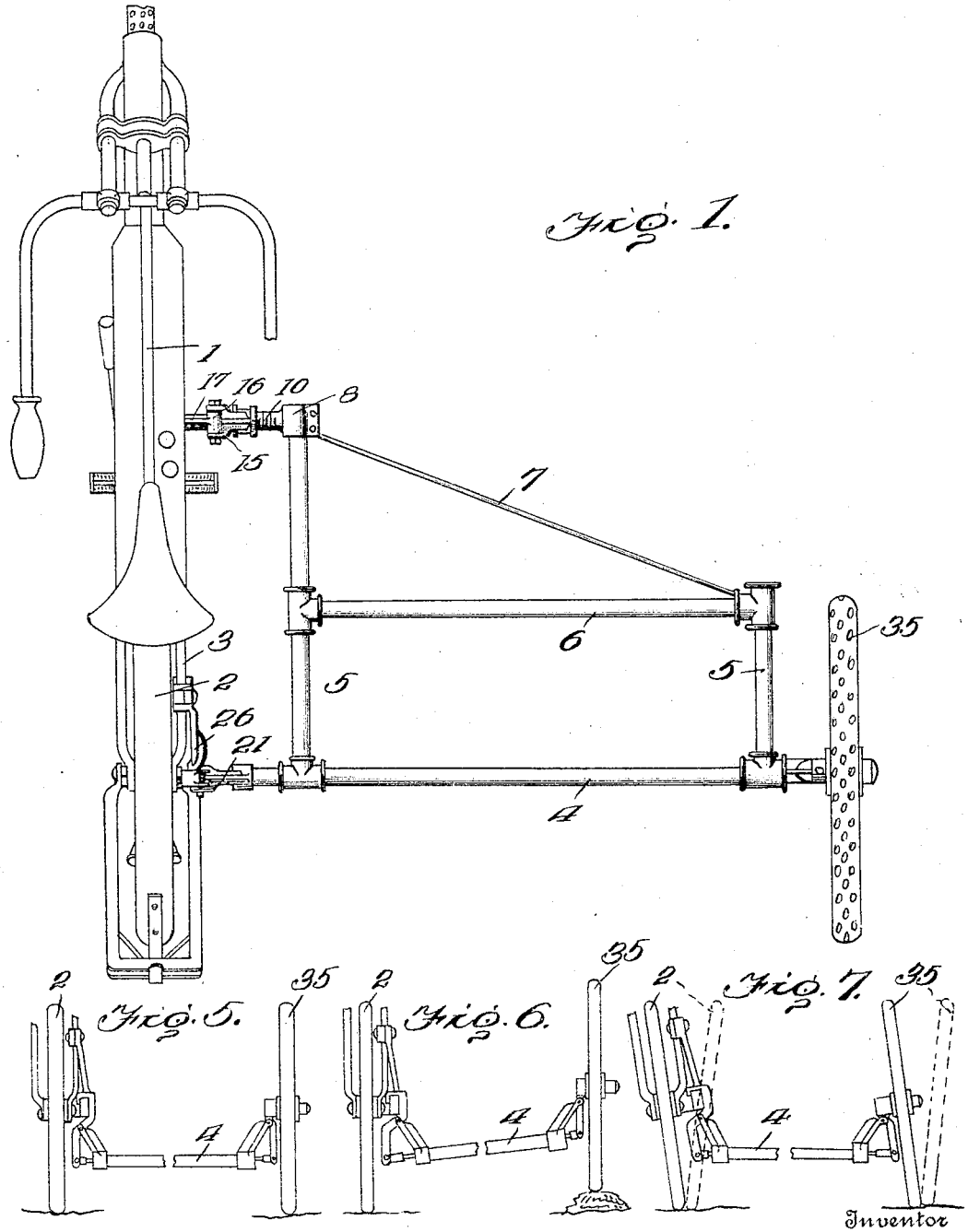

UNITED STATES PATENT OFFICE.

HUGO H. YOUNG, OF MANSFIELD, OHIO.

SIDE CAR FOR MOTOR-CYCLES.

1,235,177.  Specification of Letters Patent.  Patented July 31, 1917.

Application filed July 21, 1913.   Serial No. 780,309.

*To all whom it may concern:*

Be it known that I, HUGO H. YOUNG, a citizen of the United States, residing at Mansfield, in the county of Richland and State of Ohio, have invented certain new and useful Improvements in Side Cars for Motor-Cycles, of which the following is a specification.

This invention relates to side cars for motor cycles, and has as its object to provide means for canting the wheel of the side car to correspond to the inclination of the wheels of the motor cycle in turning a corner or rounding a curve. It is a well known fact that the ordinary type of side car presents the disadvantage that it prevents the motor cycle being inclined as it is being driven around a curve, necessitating the driver to drive slowly in order to prevent skidding. Furthermore, the wheels of the motor cycle and the wheel of the side car being held against tilting movement or canting movement, there is considerable side draft occasioned when there is any deviation from a straight line of travel. It is the aim of the present invention, therefore, as stated above, to provide means for automatically canting or tilting the wheel of the side car and permitting of inclination of the motor cycle when turning a curve, so that side draft and the danger of skidding will be eliminated.

Another disadvantage presented by the ordinary rigid type of side car is that the frame of the car is rigidly secured to the motor cycle frame and, consequently, when the wheel of the side car strikes an obstruction and is momentarily thrown upward from the road surface, the rear wheel of the motor cycle will be correspondingly moved, or the frame of the side car will be subjected to considerable strain liable to disturb its connection with the motor cycle. The present invention, therefore, contemplates so connecting the side car frame with the motor cycle frame that the wheels supporting either frame may lift when passing over obstructions without in any way affecting the wheels supporting the other frame.

The invention aims further to so construct the frame of the side car and its attaching devices that the said frame may be conveniently applied to practically any type of motor cycle.

While, as before stated, the motor cycle may tilt as also the wheels supporting the side car frame, means is provided tending to normally hold the motor cycle in upright position so that it is not necessary to brace the same against a support when not in use.

In the accompanying drawings:

Figure 1 is a top plan view of the side car embodying the present invention, the same being shown attached to a motor cycle.

Fig. 2 is a rear elevation of the frame and a portion of the motor cycle.

Fig. 3 is a perspective view of that side of the frame which is connected to the motor cycle frame.

Fig. 4 is a vertical longitudinal sectional view through the rear bar of the side car frame.

Fig. 5 is a diagrammatic view illustrating the normal positions of the motor cycle and side car wheels.

Fig. 6 is a similar view illustrating the manner in which the wheel of the side car may pass over an obstruction without affecting the engagement of the motor cycle wheels with the road surface.

Fig. 7 is a view similar to Figs. 5 and 6 illustrating in full lines, the positions assumed by the wheels in turning a curve to the left, and in dotted lines, the positions assumed in turning a curve to the right.

Corresponding and like parts are referred to in the following description and indicated in all the views of the accompanying drawings by the same reference characters.

In the drawings, the motor cycle is indicated in general by the reference numeral 1 and inasmuch as it is of a well known type, it will not be specifically described, except that it includes in its structure the usual rear wheel 2 and the usual frame having the ordinary rear fork 3.

To avoid confusion and as a matter of convenience in illustrating the invention, the body of the side car has been omitted from the drawings, and it will be understood that the frame of the side car, which will be presently fully described, may support a side car body of any of the numerous delivery and passenger types.

The frame above mentioned includes a rear bar 4 which is tubular, as clearly shown in Fig. 4 of the drawings, and which is connected by side bars 5 with a front cross bar 6. By reference to Fig. 1 of the drawings, it will be noted that the right hand one of the side bars 5 terminates at the corresponding end of the front cross bar 6 but that the left hand one of the said side bars extends forwardly a considerable distance beyond the front cross bar 6, its forward end being braced with respect to the forward end of the first mentioned side bar by means of a diagonal brace rod 7. I have found the frame above described to be well adapted for ordinary use but it will be understood that it may assume some other form and may be constructed in a different manner if desired. Also it will be observed that in the present illustration of the invention, the frame of the side car is supported at one side by the motor cycle frame and at its other side by a single wheel, but it will be evident from the description which is to follow that two wheels may be employed to support the last mentioned side of the side car frame if found expedient.

In attaching the side car frame to the frame of the motor cycle, means for this purpose is provided at the front and rear ends of the longer one of the side bars 5. The means at the forward end of the said side bar includes a sleeve 8 which is clamped as at 9 about the said forward end of the bar, and this sleeve is provided at its side next to the motor cycle frame with a laterally extending threaded stem 10. A collar 11 is loosely fitted upon the stem 10 and at one end this collar bears against a nut 12 which is adjustably threaded upon the stem, the collar being held in position against the nut 12 by means of a nut 13 engaging its opposite end. It will be apparent that the nuts 12 and 13 may be adjusted so as to adjust the collar 11 along the stem 10 and thereby properly adjust the position of the frame of the side car so that the side bars of the frame will be parallel to the motor cycle frame and the wheel supporting the side car frame will be in exact alinement with the rear wheel of the motor-cycle. The collar 11 is provided with an arm 14 which extends upwardly at an angle to the motor cycle frame and which at its upper end is formed with apertured ears 15. Pivoted between the ears 15 is one end 16 of an arm 17 which extends laterally from the lower end of a split clamping sleeve 18. The sleeve 18 is fitted to the forward reach of the motor cycle frame and is clamped to the reach by means of bolts and nuts 19.

The attaching means for the rear end of the side car frame includes a collar 20 similar to the collar 11 and secured directly to one end of the rear cross bar 4 in the manner clearly shown in Figs. 2 and 3 of the drawings. The collar 20 is provided with an arm 21 which corresponds to the arm 14 and the arm 21 has ears 22 pivoted as at 23 to a rocker 24. The upper and lower portions of the rocker are offset with respect to each other and the upper portion of the rocker has an extension 25 which fits over the rear end of a frame member 26 which is secured to the frame in a manner which will be now explained. The frame member 26 has spaced clamping heads 27 which are secured to one of the lower rear forks of the motor cycle frame and preferably integral with the member 26 are frame members 28 which support a split clamping sleeve 29 adapted to be clamped about the corresponding upper rear fork in the manner clearly indicated in Fig. 3 of the drawings. It will now be apparent that the rocker 24 is rigid with respect to the motor cycle frame so that when the motor cycle is tilted, as when turning a corner, the rocker will be correspondingly tilted upon its pivot 23.

At its end remote from the motor cycle, the rear frame bar 4 is provided with a bracket arm 30 which extends upwardly and laterally and which is provided at its upper end with spaced pivot ears 31 having mounted between them a rocker 32, similar to the rocker 24. The rocker 32, however, instead of being provided with an extension, such as the extension 25 is provided with one member 33 of a knuckle joint supporting a stub spindle 34 upon which the wheel of the side car frame, indicated at 35, is mounted. A rod 36 is pivoted at its ends to the lower ends of the rockers 24 and 32, as clearly shown in Figs. 2 and 4 of the drawings, and this rod 36 extends entirely through the tubular rear bar 4 of the side car frame and has adjustably threaded upon it adjacent each of its ends nuts 37 which may be adjusted so as to vary the tension of the springs 38 fitting upon the rod between the said nuts and the interiorly reduced portion or collar 39 located midway between the ends of the tubular frame bar.

It will now be seen that when the motor cycle frame is tilted or canted, the rod 36 will be shifted to the right or left in the tubular frame bar and by acting upon the rocker 32 will tilt or cant the wheel 35 to correspond to the wheels of the motor cycle and the motor cycle frame, this operation of parts being clearly illustrated in Fig. 7 of the drawings. As a result of the use of the connection herein shown and described between the motor cycle and side car frame, the side car supporting wheel 35 will be canted and will, therefore, be prevented from skidding, and as a further result the side draft usually present is in this manner destroyed. It will also be apparent by reference to Fig. 6 of the drawing, that due to the peculiar connection between the side car frame and the frame of the motor cycle, the wheel of the side car or the wheel of the motor cycle may pass over obstructions without affecting the engagement of the other wheel or wheels with the road surface.

In connecting the rod 36 at its ends to the lower ends of the rockers 24 and 32, the ends of the rod are threaded adjustably into sleeves 36' which have pivotal connection with the rockers, as shown in the drawings, and it will be understood that by adjusting the rod in the sleeves the distance between the pivot point may be lengthened or shortened to bring the wheels of the motor-cycle and side-car into parallel relation in the event any of the parts become sprung.

Having thus described the invention what is claimed as new is:

1. In a vehicle, a tiltable wheel supported main frame, a supplemental frame supported at one side by the main frame, a wheel supporting the other side of the supplemental frame, and adjustable means arranged to cant the said wheel upon tilting of the main frame.

2. In a vehicle, a tiltable wheel supported frame, a supplemental frame, a rocker mounted upon the supplemental frame and fixedly connected with the main frame, a second rocker mounted upon the supplemental frame, a wheel mounted upon the second mentioned rocker, a rod pivotally connected to the corresponding ends of the rockers, a relatively fixed abutment located between the ends of the rod and with relation to which abutment the rod is longitudinally movable, abutments upon the rod, and a spring arranged upon the rod between each of the last mentioned abutments and the first mentioned abutment.

3. In a vehicle, a tiltable wheel supported frame, a supplemental frame, a rocker mounted upon the supplemental frame and fixedly connected with the main frame, a second rocker mounted upon the supplemental frame, a wheel mounted upon the second-mentioned rocker, and a rod adjustably connected at its ends with the rockers and connecting the said rockers.

4. In a vehicle, a tiltable wheel supported frame, a supplemental frame, a rocker mounted upon the supplemental frame and fixedly connected with the main frame, a second rocker mounted upon the supplemental frame, a wheel mounted upon the second-mentioned rocker, sleeves pivoted to the rockers, and a rod adjustably threaded at its ends into the said sleeves.

5. In a vehicle, a tiltable wheel supported frame, a supplemental frame, a rocker mounted upon the supplemental frame and fixedly connected with the main frame, a second rocker mounted upon the supplemental frame, a wheel mounted upon the second-mentioned rocker, a rod extending between the rockers at corresponding ends thereof, a relatively fixed abutment located between the ends of the rod, the rod being slidable with respect to the abutment, springs arranged upon the rod and bearing at their adjacent ends against the abutment, and other abutments adjustable upon the rod and constituting the bearings for the other ends of the springs.

6. In an attachment of the class described, a frame including a tubular member, an attaching member to which the tubular member is pivotally connected at one end, a rocker mounted at the other end of the tubular member, a rod connected to the rocker and extending through the tubular member and connected to the said attaching member, and a spindle carried by the rocker.

7. In a side car attachment of the class described, a frame, an attaching member pivotally mounted at one side of the frame, a rocker mounted between its upper and lower ends for pivotal movement at the other side of the frame, a spindle carried by the rocker above its pivot, and connection between the said attaching member and the rocker below the pivot for the latter.

8. In a side car attachment of the class described, a frame including a tubular frame member provided at its ends with upstanding outwardly projecting bracket portions, an attaching member pivotally connected to one of the bracket portions and provided above its pivot with attaching means, a rocker pivotally supported between its upper and lower ends upon the other bracket portion, a spindle carried by the rocker above its pivot, and a rod pivotally connected at its ends to the lower end of the attaching member and to the lower end of the rocker and extending through the frame member.

9. The combination with a motorcycle frame, of a wheeled side-car chassis having a hinged connection to the frame, a spindle for the chassis wheel having a pivotal connection to the chassis and a spring opposed thrust rod having a pivoted connection to the frame and to the spindle.

10. The combination with a motor-cycle frame, of a wheeled side-car chassis having a hinged connection to the frame, a spindle for the chassis wheel having a pivoted connection to the chassis, and a spring-opposed adjustable thrust rod having a pivoted connection to the frame and to the spindle.

In testimony whereof I affix my signature in presence of two witnesses.

HUGO H. YOUNG. [L. S.]

Witnesses:
CHAS. R. HARRIS,
JAS. W. GALBRAETH.